US011714794B2

(12) United States Patent
Lin et al.

(10) Patent No.: US 11,714,794 B2
(45) Date of Patent: Aug. 1, 2023

(54) METHOD AND APPARATUS FOR READING DATA MAINTAINED IN A TREE DATA STRUCTURE

(71) Applicant: HUAWEI CLOUD COMPUTING TECHNOLOGIES CO., LTD., Gui Zhou Province (CN)

(72) Inventors: Shu Lin, Richmond Hill (CA); Chong Chen, Richmond Hill (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 27 days.

(21) Appl. No.: 17/218,937

(22) Filed: Mar. 31, 2021

(65) Prior Publication Data
US 2022/0318218 A1    Oct. 6, 2022

(51) Int. Cl.
*G06F 16/00* (2019.01)
*G06F 16/22* (2019.01)
*G06F 16/23* (2019.01)
*G06F 16/27* (2019.01)
*G06F 16/2455* (2019.01)

(52) U.S. Cl.
CPC ...... *G06F 16/2246* (2019.01); *G06F 16/2343* (2019.01); *G06F 16/24552* (2019.01); *G06F 16/27* (2019.01)

(58) Field of Classification Search
None
See application file for complete search history.

(56) References Cited

U.S. PATENT DOCUMENTS

| 7,788,243 B2* | 8/2010 | Pasupuleti | G06F 16/27 707/704 |
| 8,086,580 B2* | 12/2011 | Sachedina | G06F 16/2343 707/704 |
| 9,003,162 B2* | 4/2015 | Lomet | G06F 16/2246 707/999.2 |

(Continued)

FOREIGN PATENT DOCUMENTS

| CN | 103530253 A | 1/2014 |
| WO | 2020164718 A1 | 8/2020 |

OTHER PUBLICATIONS

Amazon Aurora (Feb. 15, 2022), "Working with parallel query for Amazon Aurora MySQL", User Guide for Aurora [https://docs.aws.amazon.com/AmazonRDS/latest/AuroraUserGuide/aurora-mysql-parallel-query.html].

(Continued)

*Primary Examiner* — Debbie M Le

(57) ABSTRACT

The present disclosure provides a method of reading data maintained in a tree data structure, such as B+ tree, using near data processing (NDP) in a cloud native database. According to embodiments, a desired LSN will be used in NDP page reads on the master computing node (e.g. master SQL node). When the master computing node (e.g. master SQL node) reads the regular page, the maximum desired LSN (e.g. the latest page version number) for that regular page will be used. Embodiments use features of the desired LSN and page locking, wherein correct versions of pages can be obtained by using the desired LSN associated with a page, in combination with page locking, and can enable the reading of a consistent tree structure and achieve good read/write concurrency.

20 Claims, 10 Drawing Sheets

(56) References Cited

U.S. PATENT DOCUMENTS

| | | | |
|---|---|---|---|
| 9,286,328 B2 * | 3/2016 | Kozin | G06F 11/14 |
| 9,519,664 B1 * | 12/2016 | Kharatishvili | G06F 16/316 |
| 10,725,983 B2 | 7/2020 | Larson et al. | |
| 11,106,541 B2 | 8/2021 | Depoutovitch et al. | |
| 11,409,781 B1 * | 8/2022 | Brahmadesam | G06F 16/254 |
| 2008/0065644 A1 | 3/2008 | Pasupuleti et al. | |
| 2009/0100237 A1 * | 4/2009 | Orikasa | G06F 12/0804 |
| | | | 711/E12.002 |
| 2012/0059963 A1 | 3/2012 | Pasupuleti et al. | |
| 2013/0238656 A1 | 9/2013 | Chen et al. | |
| 2021/0200756 A1 | 1/2021 | Chen et al. | |

OTHER PUBLICATIONS

Verbitski et al. "Amazon Aurora: Design Considerations for High Throughput Cloud-Native Relational Databases". In Proceedings of the 2017 ACM International Conference on Management of Data (SIGMOD '17), Chicago, IL, USA, May 14-19, 2017. ACM, New York, NY, USA, 1041-1052.

Antonopoulos et al. "Socrates: The New SQL Server in the Cloud". In Proceedings of the 2019 International Conference on Management of Data (SIGMOD '19), Amsterdam, Netherlands, Jun. 30-Jul. 5, 2019. ACM, New York, NY, USA, 1743-1756.

Depoutovitch et al. "Taurus Database: How to be Fast, Available, and Frugal in the Cloud". In Proceedings of the 2020 International Conference on Management of Data (SIGMOD '20), Portland, Oregon, USA, Jun. 14-19, 2020. ACM, New York, NY, USA, 16 pages.

* cited by examiner

METHOD AND APPARATUS FOR READING DATA MAINTAINED IN A TREE DATA STRUCTURE

CROSS-REFERENCE TO RELATED APPLICATIONS

This is the first application filed for the present invention.

FIELD OF THE INVENTION

The present invention pertains to the field of database data processing and distributed database management and in particular to a method and apparatus for reading data maintained in a tree data structure using near data processing (NDP) in a cloud native database.

BACKGROUND

The demand for a cloud-based database as a service (DBaaS) is rapidly increasing as more computer applications, platforms or infrastructures that are used by many companies and government agencies have now been placed in the cloud. Upon the shift of markets and business models, such DBaaS services are provided by Amazon™, Microsoft™, Google™, Alibaba™, Huawei™ and other cloud providers. Initially, these providers offered DBaaS services using traditional monolithic database software. In other words, these providers merely operated the regular version of the database system on virtual machines in the cloud, using either local storage or cloud storage. While simple to implement, this approach may not provide what customers want from a database service. For example, this form of database system does not provide good performance and scalability, and can incur high storage cost.

FIG. 1 illustrates a typical database deployment using a traditional database architecture. Referring to FIG. 1, the traditional database architecture 100 includes the structured query language (SQL) master node 110, the SQL replicas 120 and the storage nodes 131 and 132. The SQL master node 110 and the SQL replicas 120 are communicatively connected to each other. Each of the SQL master node 110 and the SQL replicas 120 are communicatively connected to the storage nodes 131 and 132, respectively, over the network 140. The SQL master node 110 writes logs to its own storage node 131, and ships logs to the SQL replicas 120. Each of the SQL replicas 120 applies the log on their respective own storage nodes 132. The data pages of databases will be saved redundantly in three storage nodes, namely the master storage node and each storage node associated with the replicas. Provided that each storage node in the cloud usually has 3 copies, the data pages will be saved 9 times in this database architecture 100, thereby causing a significant resource waste.

Therefore there is a need for a method and apparatus for reading data in a database, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for reading data maintained in a tree data structure using near data processing (NDP) in a cloud native database. In accordance with embodiments of the present invention, there is provided a method for obtaining one or more pages in response to a query using near data processing (NDP) in a cloud native database. The method includes receiving a query, the query including information indicative of one or more required pages, the information further indicative of a version of each of the one or more required pages and scanning a general buffer pool to identify one or more of the required pages. Upon identification of one or more of the required pages in the general buffer pool, the method further includes copying the identified one or more required pages into a private buffer pool associated with the query. Upon identification of no further required pages in the general buffer pool, the method further includes sending a request to one or more storage nodes for one or more of the required pages remaining to be identified. The method further includes receiving the one or more remaining required pages and copying the received one or more remaining required pages into the private buffer pool.

In some embodiments, the method further includes applying a shared lock to the identified one or more required pages prior to copying the identified one or more required pages. In some embodiments, the version of the one or more required pages is defined by a log sequence number (LSN). In some embodiments, the method further includes applying a shared lock on a root of a B+ tree associated with the one or more required pages. In some embodiments, the method further includes copying the received one or more remaining required pages into the general buffer pool.

In accordance with embodiments of the present invention, there is provided a method of reading data in a data tree using near data processing (NDP) in a cloud native database. The method includes applying a shared page lock on a root and internal pages across the data tree, in a top-down manner, until reaching P0, the P0 referring to a page at a level immediately above the leaf level of the data tree and acquiring a desired log sequence number (LSN) while holding the shared page lock on the P0. After acquiring the desired LSN, for each extracted child page, the method further includes allocating a page from a free list of a buffer pool to a NDP cache area of the buffer pool, the NDP cache area designated for a specific query and upon allocating the page to the NDP cache area, determining whether the child page is found at a regular page area of the buffer pool and securing the child page to the page allocated in the NDP cache area based on the determination. The method further includes releasing the shared page lock applied on the P0, processing the pages allocated to the NDP cache area and upon completion of processing, releasing each of the pages allocated to the NDP cache area back to the free list of the buffer pool.

In accordance with embodiments of the present invention, there is provided a device supporting near data processing (NDP) in a cloud native database. The device includes a network interface for receiving data from and transmitting data to devices connected to a network, a processor and machine readable memory storing machine executable instructions. The instructions, when executed by the processor configure the device to perform one or more of the methods as defined above or elsewhere herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
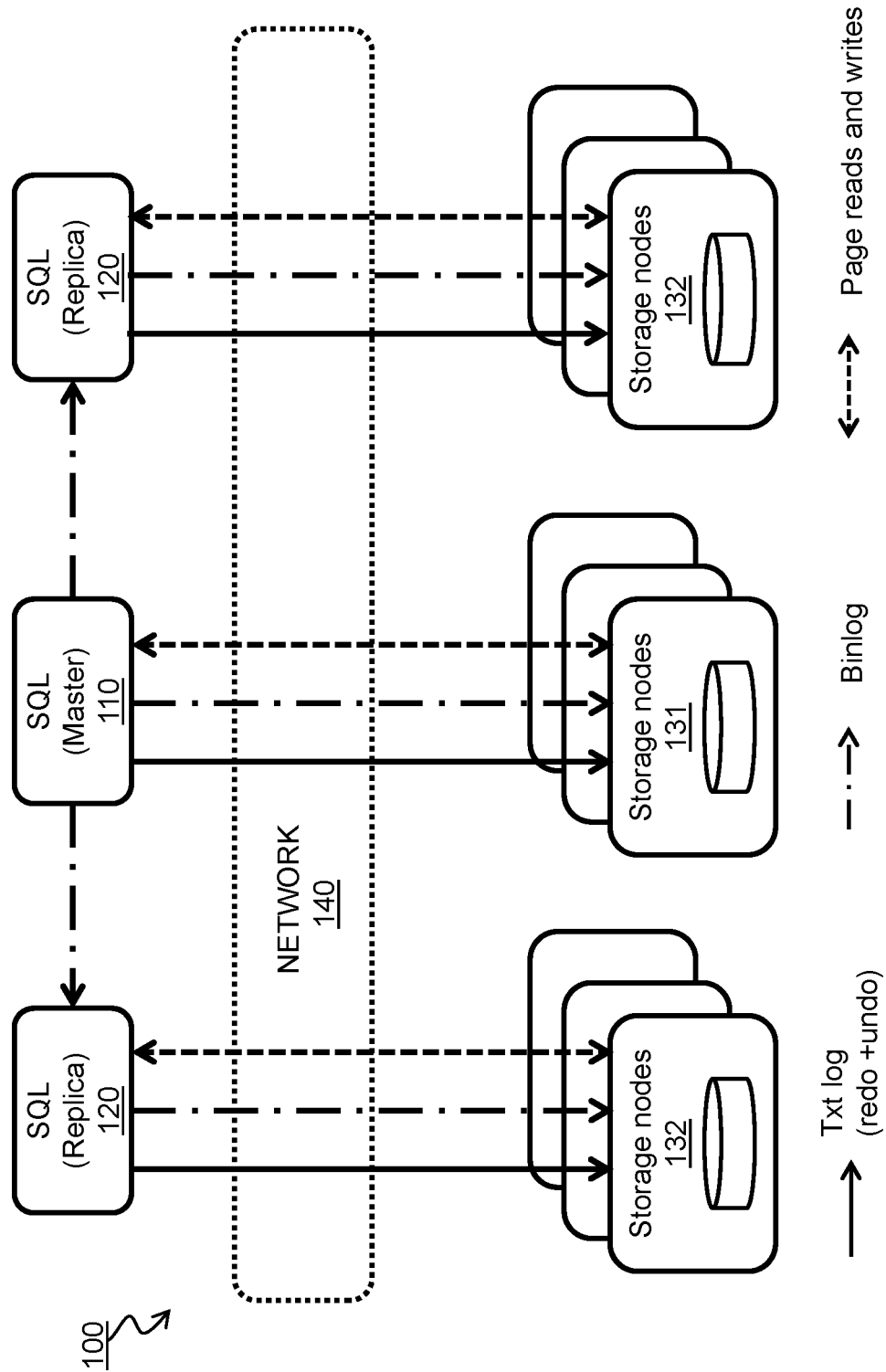
FIG. 1 illustrates a typical database deployment using a traditional database architecture, according to the prior art.

In the present disclosure, the term 'database page' or "page" refers to a basic internal structure used to organize data in the database files. For example, a database page may be a unit of storage whose size may be configurable on a system-wide, database-wide, or conglomerate-specific basis. A page may be identified by an identifier (ID), such as a page ID or a space ID. Data in the database is organized based on the database page. The size of a database page can vary for example, 4 KB, 8 KB, 16 KB or 64 KB. Often, database pages are organized based on a tree structure, such as a 'B-tree'.

In the present disclosure, the term 'redo log' refers to a mean (e.g. file) that records a history of all changes made to the database. In general, a redo log record (or more generally a database log) is indicative of one or more physical changes on the page content, for example, "on page 11, offset 120, write a 5-byte content". Each redo log contains one or more redo log records (or more generally database log records). A redo log record, also called a redo entry or log entry, holds a group of change vectors, each of which describes or represents a change made to a single block or page in the database. The term redo log may stem from specific database management system (DBMS) models; however a redo log may also be commonly used in a generic manner, to refer to a database log. MySQL™ is an example database model that uses the term redo log. MySQL™ is an example database model that may be used to implement examples described herein. It should be understood that the present disclosure may be equally applicable to other database models. A database model is a type of data model that determines or defines a logical structure of the database and determines in which manner data can be stored, organized, and manipulated. An example of a database model is the relational model, which uses a table based format to store, organize, and manipulate data.

In the present disclosure, the term 'log sequence number' (LSN) is a number indicating a position or a location of the log record within the log file. The LSN order is the logical order of log generation time. Log records are ordered in global redo log buffer based on the LSN order. Typically, log records are ordered in increasing LSN. The LSN order must be strictly followed; otherwise, data retrieved from the database will be incorrect. Each page also has an LSN value, named the page lsn. The page lsn is the LSN of the redo log at the last page update.

In the present disclosure, 'desired LSN' is used by the computing nodes (e.g. SQL nodes) to request a particular page version retrieved from database component(s) (e.g. page stores in Huawei's Taurus™ database, which maintain multiple page versions). 'Desired LSN' can be also used to represent a physical state of the entire database at a certain time point. It will be readily understood that other identifiers, for example time stamp, hash or other identifier can be used to define a particular version of a page.

In the present disclosure, the term 'near data processing' (NDP) refers to a type of database processing which places processing power near data, rather than conveying the data to the processor. Some database processing, such as column projection, predicate evaluation and data aggregation, can be pushed into a storage node (e.g. page stores in Huawei Taurus™ database) thereby reducing network traffic between the computing nodes (e.g. SQL nodes) and the storage nodes.

In some embodiments of the present disclosure, the term "node" refers to a physical device or electronic device which is configured to perform one or more of the actions as defined herein and associated with a "node". In some embodiments of the present disclosure, a "node" can be configured as a logical construct, for example configured as one or more of software, hardware and firmware, which is configured to perform one or more of the actions as defined herein and associated with a "node".

The present disclosure provides a method and apparatus for reading/searching data maintained in a tree data structure, such as B+ tree, using near data processing (NDP) in a cloud native database. According to embodiments, an NDP scan (data read/search in NDP) does not block concurrent modifications of the the B+ tree, and retrieves consistent B+ tree pages even when the B+ tree is under concurrent modification. According to embodiments, an NDP scan can also share the same memory pool (e.g. a buffer pool) with the regular data scan. Further, according to embodiments, NDP can utilize pages that already exist in the buffer pool (e.g. memory pool shared with the regular data scan) and therefore may avoid input/output (IO) on this page. A technical advantage of may be that searching and reading a data tree does not block concurrent modifications of the the B+ tree by other queries, while retrieving consistent B+ tree pages even when the B+ tree is under concurrent modification.

The present disclosure provides a method of reading data maintained in a tree data structure, such as B+ tree, using near data processing (NDP) in a cloud native database. According to embodiments, a desired LSN will be used in NDP page reads on the master computing node (e.g. master SQL node). When the master computing node (e.g. master SQL node) reads the regular page, the maximum desired LSN (e.g. the latest page version number) for that regular page will be used. Embodiments of the present disclosure uses both features of the desired LSN and page locking. It is realised that the correct versions of pages can be obtained by using the desired LSN associated with a page, in combination with page locking, and can enable the reading of a consistent tree structure and achieve good read/write concurrency.

Embodiments of the present disclosure make use of existing regular pages in a buffer pool for NDP pages. This reduces input/outputs (IOs) and can also ensure that storage nodes can serve the page version requested from the master computing node (master SQL node).

According to embodiments, regular pages and NDP pages (e.g. custom made NDP data) can share the same memory pool (i.e. buffer pool). In various embodiments, the memory pool (buffer pool) can be shared by dividing a complete buffer pool into logical areas: a regular page area and NDP cache areas, or private buffer pool, for each NDP query. If there is not a currently executed NDP query, the NDP cache area does not exist and thus all of the buffer pool memory can be used by regular pages.

Embodiments of the present disclosure provide read/write concurrency while dealing with distributed storage nodes. For example, the B+ tree can be modified concurrently with the desired LSN in NDP reads, when the storage nodes and the SQL node are processing the current batch of leaf pages.

Embodiments of the present disclosure, while providing read/write concurrency, can achieve efficient use of memory and IO resources. When no NDP reads are occurring, the entire buffer pool is available for regular pages. Further, the existing regular pages in the buffer pool can be used by NDP.

Embodiments of the present disclosure are capable of using short-lived desired LSN (i.e. desired LSN with short life time). Specifically, a specific desired LSN value can be valid only for the period of reading the batch of leaf pages (e.g. period of reading the leaf pages of a particular level-1 page). This can be beneficial as storage nodes are not required to keep a lot of old page versions. If long-lived desired LSN is used, a heavy burden would be imposed on the storage nodes (e.g. overhead), for example when there is large updates on the database, as the storage nodes have to keep numerous old versions of pages.

As stated above, traditional database architecture, at least in some circumstances, result in underperformance and poor scalability. As such, cloud providers have recently built new cloud-native relational database systems designed for cloud infrastructure. In general, many cloud native databases separate the compute layer from the storage layer and offer beneficial features such as read replica support, fast fail-over and recovery, hardware sharing and scalability, for example of up to 100 terabytes (TB).

Figure 2:
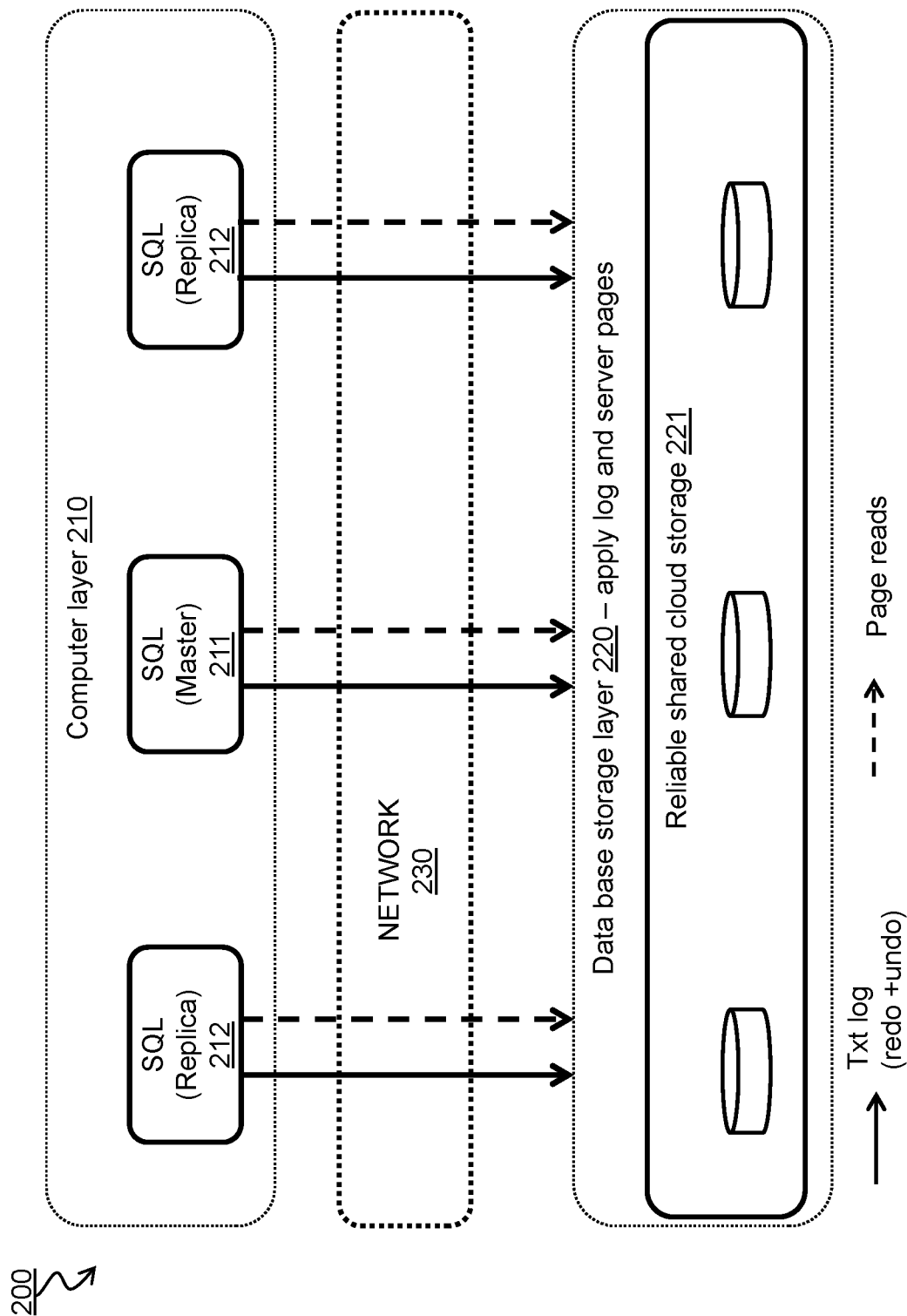
FIG. 2 illustrates an example of the architecture of cloud-native relational database systems, in accordance with embodiments.

At a conceptual level, cloud-native relational database systems have similar architecture, for example as illustrated in FIG. 2. FIG. 2 illustrates an example of the architecture of cloud-native relational database systems such as Amazon Aurora™, Microsoft Socrates™ and Huawei Taurus™. Referring to FIG. 2, in the cloud-native database architecture 200, software is split into two separate layers, the compute layer 210 and the storage layer 220 that communicate over the network 230. The compute layer 210 includes a single SQL master (primary) node 211 and multiple read-only SQL replicas nodes 212. Each of the SQL master node 211 and SQL replica nodes 212 is communicatively connected to the storage layer 220. In fact, the SQL master node 211 and SQL replica nodes 212 share the storage layer 220. By sharing the storage layer 220, storage cost can be saved, when compared with a traditional database architecture. The SQL master node 211 handles all update transactions. The master node 211 ships log records to the storage layer 220 over the network 230. The storage layer 220 writes the log records to the reliable, shared cloud storage 221. The storage layer 220 has three main functions, storing database pages, applying received log records to keep pages up to date, and responding to read page requests. The storage layer 220 partitions the database pages and maintains them across several storage nodes.

While each cloud-native database system may have different components, further details about the cloud-native database system will be illustrated below, for example with respect to components of the database system and alternative implementations.

Figure 3:
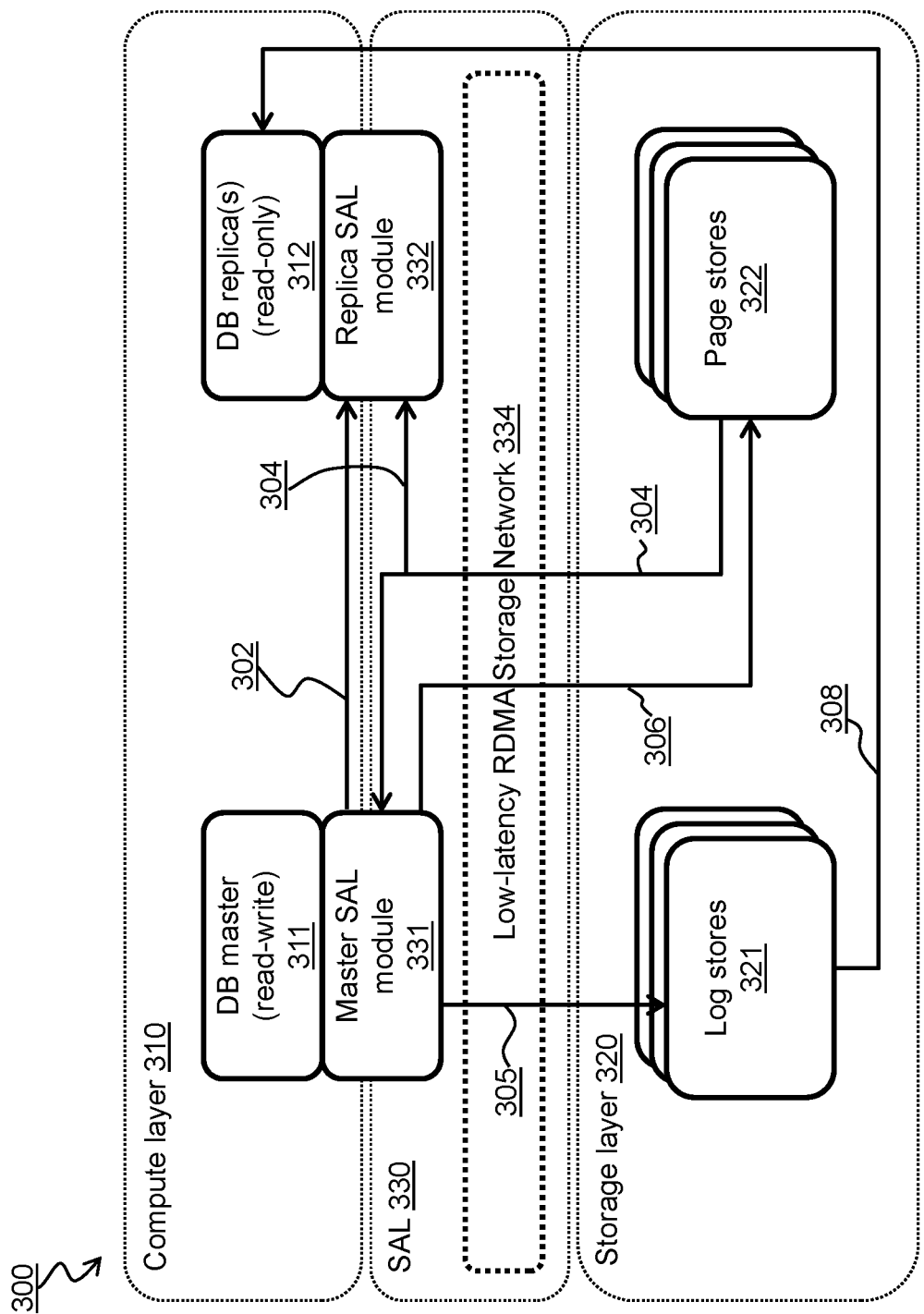
FIG. 3 illustrates the architecture of the cloud-native database system, in accordance with embodiments.

FIG. 3 illustrates the architecture of the cloud-native database system, in accordance with embodiments. The architecture of the cloud-native database system illustrated in FIG. 3 is similar to that of the Huawei Taurus™ database system.

According to embodiments, there are four major components in the cloud-native database system 300. The four major components are log stores 321, page stores 322, storage abstraction layer (SAL) 330 and the database front end. These four major components are distributed between two physical layers, namely a compute layer 310 and a storage layer 320. As there are only two physical layers, the amount of data sent across the network 334 can be minimized and the latency of requests can be reduced (e.g. a request can be completed with a single call over the network). The SAL 330 is a logical layer that separates the compute layer 310 and the storage layer 320.

The compute layer 310 includes a single SQL master (database (DB) master) node 311 and multiple read replicas (DB replicas) 312. The single SQL master (DB master) node 311 deals with both read and write queries, and is therefore responsible for handling all database updates and data definition language (DDL) operations. The read replicas (DB replicas) 312 can only execute read queries, and are therefore responsible for handling read-only transactions. The read replicas view of the database can be envisioned as being slightly behind that of the SQL master node 311. Database transactions, which include multiple statements such as insert, update, delete, select (i.e. read request), are handled by the database nodes 311 and 312 in the compute layer 310. It should be noted that the database nodes 311 and 312 may not be physical hardware servers, but rather software running on the physical processing resources of the cloud. Database nodes 311 and 312 may be software (e.g. an instance of the database nodes 311 and 312) running on a virtual machine (e.g. an abstracted machine) or a container (e.g. an abstracted operating system (OS)) provided by the cloud. Generally, instances of the database nodes 311 and 312 may be considered to have physicality because any instance is implemented on a physical machine.

Each of the database nodes 311 and 312 communicates with the storage abstraction layer (SAL) 330 via a respective master SAL module 331 or replica SAL module 332. The SAL 330 may be considered to span the database service and the virtualized storage resources and provide a layer of abstraction that pools physical resources to serve both the database service and the virtualized storage resources. It should be noted that the SAL 330 is not a typical layer of a traditional database service (e.g., database services provided by traditional cloud service providers). The cloud-native database system 300 includes the SAL 330, and may use the SAL 330 to implement functions as discussed further below and elsewhere herein. Each SAL module 331, 332 may be a software instance that is implemented in the SAL 330. For simplicity, an instance of the SAL module 331, 332 may be referred to herein as simply the SAL module 331, 332. The SAL module 331, 332 provides the functions of the logical SAL 330. In some examples, one or more functions of the SAL module 331, 332 may instead be implemented in the storage layer 320. The SAL 330 serves to isolate the front-end (provided by the compute layer 310), which is client-facing, from the way the database is organized and managed.

Data (including redo logs and pages of the database) is stored in the storage layer 320. The storage layer 320 is accessible via a network, for example a remote direct memory access (RDMA) network. The storage layer 320 may be a distributed storage system provided by, for example, the virtualization layer that provides a relatively fast, reliable and scalable storage. The storage layer 320 includes the log store servers 321 and the page store servers 322. Put another way, the log store 321 and the page store 322 completely belong to the storage layer 320. The log store 321 is primarily configured to persist log records generated by the SQL master node 311. The log store 321 can save database transaction logs, all redo logs and write ahead logs (WAL). The page store 322 is primarily configured to serve page read requests (i.e. requests to read data from one or more pages) coming from the database (DB) master node 311 or a read replica node 312. The page store 322 can construct pages based on the redo logs from the SQL master node 311 and provide page look up service. The page store 322 can recreate a version (for example an earlier version or the current version) of a page that the database nodes 311 and 312 may request. In the cloud-based database system 300, the page store(s) 322 are running on by a cluster of storage resources. Each page store server 322 receives or has access to all log records that have been produced for the pages that for which it is responsible. Then, the page store server 322 consolidates the logs into a database page.

Although described in the context of a single database above, it should be understood that, in some examples, two or more databases may be managed using the cloud-native database system 300 (e.g. with logical separation separating individual databases). Each of the databases is divided into small fixed-size (e.g. 10 gigabyte (GB)) subsets of pages called slices. Each page store 322 is responsible for respective multiple slices. The slices managed by a single page store 322 may include slices with pages from different databases. Also, each page store server 322 receives (redo) logs only for the pages that belong to the slices managed by that page store server. Generally, a database can have multiple slices, and each slice can be replicated to multiple page stores 322 for durability and availability. For example, in the event that one particular page store 322 is unavailable, another page store 322 to which the slice has been replicated may be used to continue to serve requests to access data from (i.e. read from) or modify data stored in (i.e. write to) that slice. In some embodiments, functionalities of the log stores 321 can be integrated into the page stores 322.

Operations performed by the master SAL module 331 include sending redo log record updates from the database master node 311 to the database replica node(s) 312 (arrow 302); sending information regarding the physical location of the redo log (i.e. identifying the log store 321) to enable the database replica node(s) 312 to know where to access (i.e. read) the latest redo log records, for example as also illustrated by arrow 302). The master module 331 can also perform operations including accessing (i.e. reading) pages from the page store(s) 322 (i.e. as illustrated by dashed arrow 304); and writing redo log record to the log store(s) 321 (i.e. as illustrated by arrow 305) and page store(s) 322 (i.e. as illustrated by arrow 306). Operations performed by the replica SAL module 332 include receiving redo log record updates from the database master node 311 (i.e. as illustrated by arrow 302); and receiving updates to redo log records from the log store(s) 321 (i.e. as illustrated by arrow 308).

The storage abstraction layer (SAL) 330 is a library that isolates the existing database front end (e.g. MySQL™ or Postgres™) code from the underlying complexity of remote storage, slicing of the database, recovery and most of database replica synchronization complexity. The SAL 330 is responsible for writing log record data to the log stores 321 and page stores 322. The SAL 330 is further responsible for reading pages from the page stores 322. The SAL 330 is also responsible for creating, managing, and destroying slices in the page store(s) 322 and assigning pages to the slices. In some embodiments, each SAL module 331, 332 may be linked to a database node 311, 312. In some embodiments, each SAL module 331, 332 may be implemented by another component in the cloud-native database system 300 (e.g., a SAL module may be implemented by another server that is not linked to a database node 311, 312, such as a storage server). In some embodiments, as an alternative implementation the SAL 330 can be run on an individual node.

Each database node 311, 312 may be served by a respective SAL module 331, 332 (as shown). In some examples, a single instance of the SAL module serving the functions of both the master SAL module 331 and the replica SAL module 332 may serve two or more database nodes 311, 312. In some examples, a single instance of such a SAL module may serve all database nodes 311, 312 in the cloud-native database system 300. In some examples, the SAL 330 may be implemented using independent SAL module(s) 331, 332 that may be running on a virtual machine, in a container, or on a physical server. In some embodiments, functionality of the SAL 330 can be directly integrated into the existing database code, without using a separate library. However, it should be understood that the function of parsing the log and sending the parsed log to different page stores 322 does not exist in traditional database kernel code.

Whenever a database is created or expanded, the SAL 330 selects page stores 322 and creates slices on the selected page stores. Whenever the database front end decides to flush log records, the log records in the global flush buffer are sent to the SAL 330. The SAL 330 first writes the log records to the currently active log store replicas 321 guaranteeing their durability. Once the log records are successfully written to all log store replicas 321, the writing thereof can be acknowledged to the database and the log records are parsed and subsequently also distributed to the per-slice flush buffers. These slice buffers are subsequently flushed either when the buffers are full or when a timeout expires.

In conventional data processing, the structured query language (SQL) query needs to fetch all data over the network from data storages to the computing nodes (e.g. SQL nodes), and then execute projection, predicate evaluation, and aggregation, etc. in the computing node. This can be significant process especially for analytical queries as analytical queries may require significant amounts of data to be accessed and aggregated. Moreover, such analytical queries may be required to perform full database table scans, which can tend to be significantly large task, as the analytical queries are often ad-hoc and therefore indexes are not pre-built to serve them.

Near-data processing (NDP), as stated above, places processing power near data, for example bringing some of the SQL operators into the storage nodes. Therefore, NDP conducts pre-evaluation inside the storage node in order to filter out unnecessary data set, and then return only a matched subset of this data to computing nodes (e.g. SQL nodes) for further processing.

With NDP in place, a large amount of page traffic can be avoided for an analytical query. For example, part of NDP query tasks (e.g. some database processing tasks such as projection, predicate evaluation and aggregation) can be moved to the storage nodes thereby releasing at least some resources (e.g. SQL layer central processing unit (CPU)). Therefore, using NDP, an analytical query can have less of an impact on online transaction processing (OLTP) operations. In some cases, transactional processing (e.g. OLTP) and analytical processing (e.g. online analytical processing (OLAP)) can be performed concurrently, in parallel, up to a certain extent. This parallel processing is possible when, for example, OLAP tasks use less computing node (e.g. SQL nodes) resources thereby rendering more computing node (e.g. SQL nodes) resources available for OLTP tasks.

As described above, NDP reduces page read and other network input/output (IO) operations, and therefore can accelerate query speed. As a result, the required bandwidth and input/output operations per second (IOPS) can be lowered due to the reduced amount of data and the reduced number of page reads, respectively.

The following query example illustrates how NDP can be executed:

SELECT c_name FROM customer WHERE c_age>20

Referring to the query above, having regards to the column projection, only column c_name needs to be sent from the storage nodes to the computing nodes (e.g. SQL nodes). Having regard to the predicate evaluation, only rows satisfying "c_age>20" need to be sent from the storage nodes to the computing nodes (e.g. SQL nodes).

The following is another query example illustrating how NDP can be executed having regards to aggregation.

SELECT count(*) FROM customer

The above query returns the number of rows, and therefore only 'the number of rows' needs to be sent from the storage nodes to the computing nodes (e.g. SQL nodes).

Figure 4:
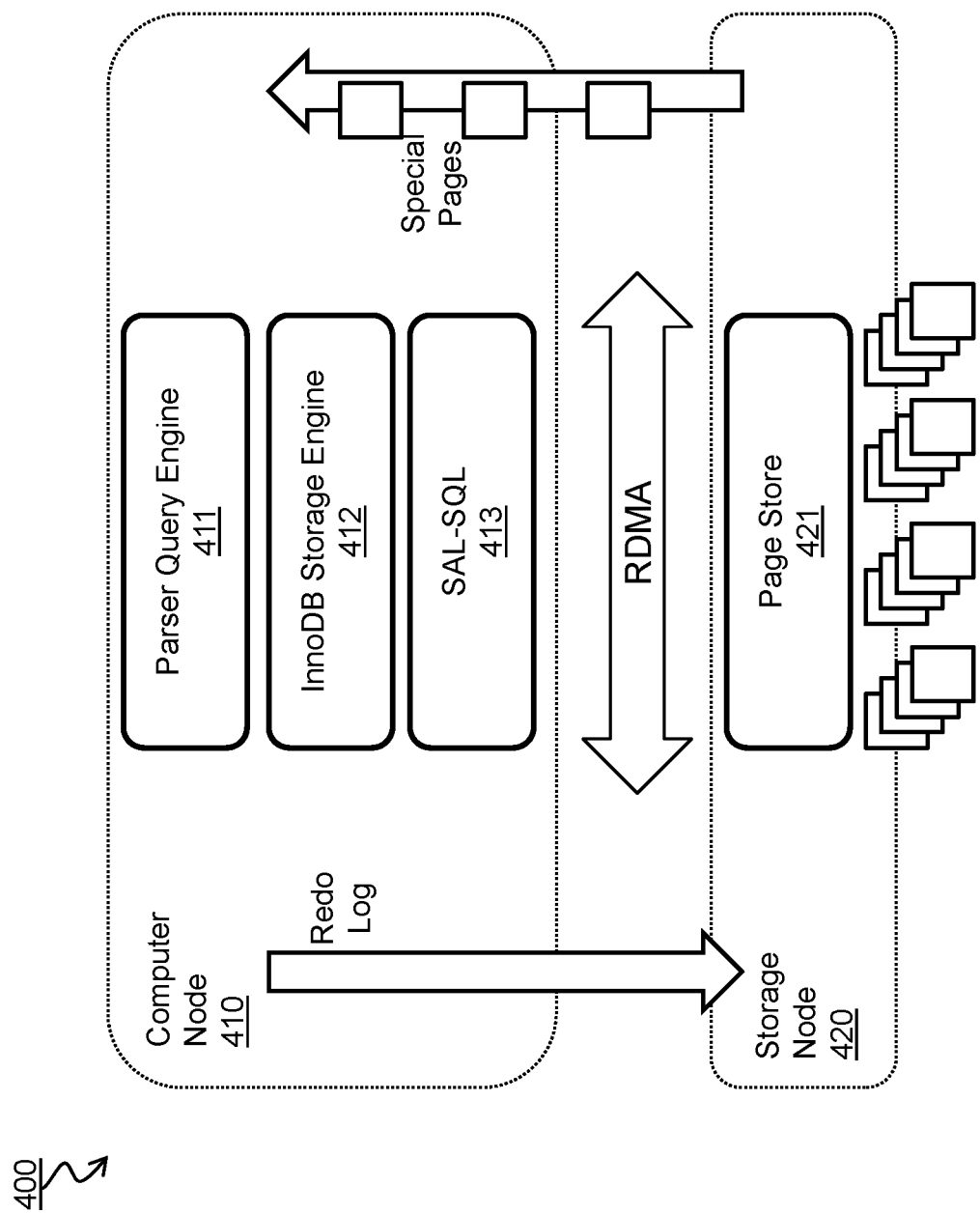
FIG. 4 illustrates the architecture of the cloud-native database system performing near data processing (NDP), in accordance with embodiments.

FIG. 4 illustrates an architecture of the cloud-native database system performing near data processing (NDP), in accordance with embodiments. The architecture of the cloud-native database system illustrated in FIG. 4 is similar to that of GaussDB™ (for MySQL™). The system 400 includes the computing node (SQL node) 410 and the storage node 420.

The computing node (SQL node) 410 includes the parser query engine 411, the InnoDB storage engine 412 and the SAL SQL module 413. The parser query engine 411 is a SQL optimizer that analyzes SQL queries (e.g. parses and recognizes queries) and determines efficient execution mechanisms like NDP. The parser query engine 411 supports multi-threading parallel executions for some SQL commands, for example 'sort', 'aggregation', 'join' and 'groupby'. The parser query engine 411 provides code-gen (code generation) technology (e.g. low level virtual machine (LLVM) based) code generation technology) to improve the execution performance of queries. The InnoDB storage engine 412 supports batch pages to push down to the storage nodes thereby reducing input/output requests. The InnoDB storage engine 412 is a multi-version concurrency control (MVCC) storage engine so that many versions of the single row can exist at the same time. The SAL SQL module 413 enables the computing node 410 to interact with the underlying storage node 420.

The storage node 420 includes a page store 421 that serves page read requests coming from the computing node (SQL node) 410. The storage node 420 supports NDP operations for example projection, predication, aggregation and MVCC.

Provided that the computing node 410 and storage node 420 are separated, without near data processing (NDP), data has to cross the network between the computing node 410 and the storage node 420. For example, after the computing node 410 is processed, the data will be written back to the storage node 420, back and forth several times, which can be inefficient. Using NDP, the computing node 410 conveys redo logs to the storage node 420, and the storage node 420 returns, to the computing node 410, only a matched subset (e.g. special pages) with unnecessary data sets being filtered out. As large amounts of data set do not have to be transferred over the network, the amount of required network bandwidth and I/O resources can be significantly reduced.

The computing node (e.g. SQL node) has its local page cache (or buffer pool) to hold pages for database transactions to access. Under traditional query processing (i.e. without NDP), all B+ tree pages are read into the buffer pool, and page locking is used to coordinate concurrent reads and writes on the same data page. However, as the NDP data received from the storage nodes is custom-made for a particular query, such NDP data should not be shared with other queries. Also, the distributed cloud storage nodes may receive the updates on the data pages at different times. These factors create challenges on how to coordinate NDP reading B+ tree and other transactions modifying the B+ tree concurrently.

Figure 5:
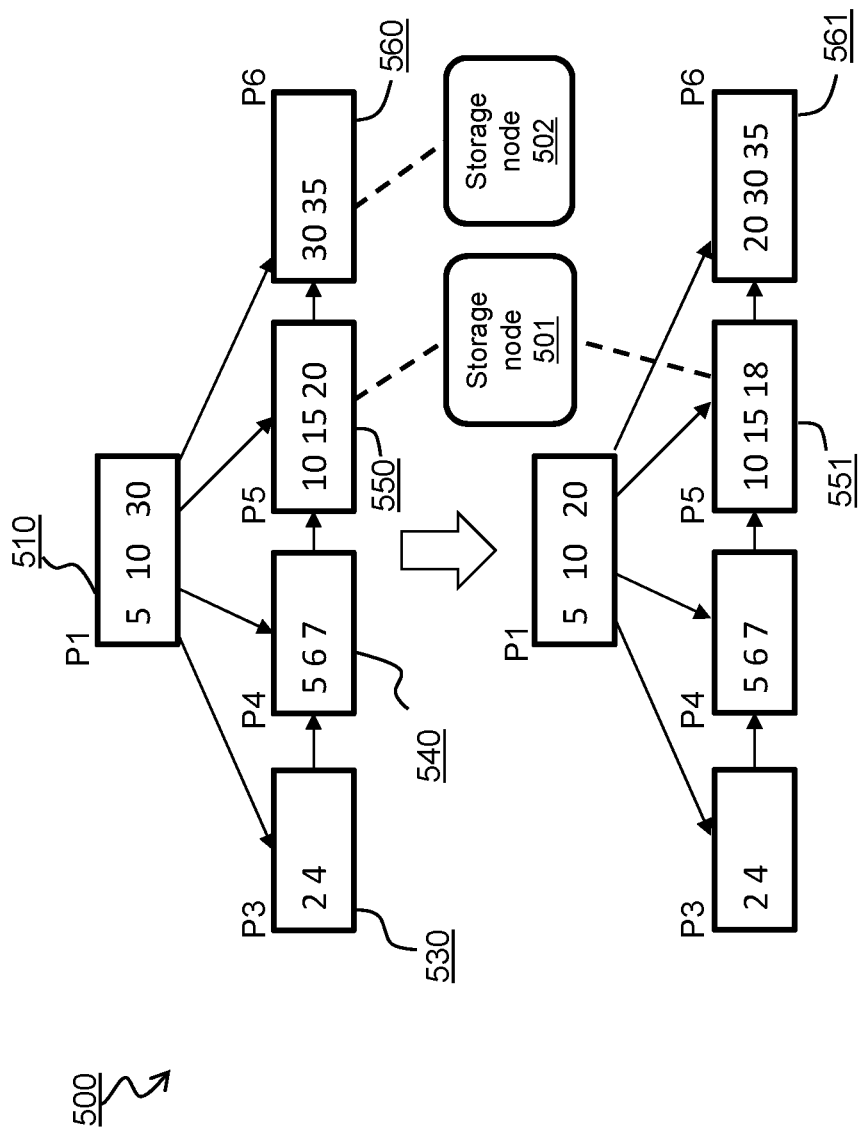
FIG. 5 illustrates a potential issue arising from B+ tree modification.

FIG. 5 illustrates a potential issue arising from B+ tree modification. Referring to FIG. 5, the B+ tree 500 includes an internal page P1 510 and its four child pages, P3 530, P4 540, P5 550 and P6 560. The child nodes P3 530, P4 540, P5 550 and P6 560 may be leaf pages. The data contained in page P5 550 is located in storage node 501 and the data contained in page P6 560 is located in storage node 502. Put another way, page P5 550 has direct access to the storage node 501 and page P6 560 has direct access to the storage node 502.

In FIG. 5, it is assumed that a NDP request on page P5 550 and page P6 560 has been made but the request has not currently reached storage nodes 501 and 502. Upon this assumption, when a concurrent transaction modifies page P5 550 and page P6 560, the storage node 501 would receive the data contained in new page P5 551 however storage node 502 would not receive the data contained in new page P6 561. In other words, upon the NDP request, storage nodes 501 and 502 will return data contained new page P5 551 and old page P6 560, respectively, and therefore the number "20" is not found in old page P6 560 during the scan, thus rendering an incorrect query result.

Figure 6:
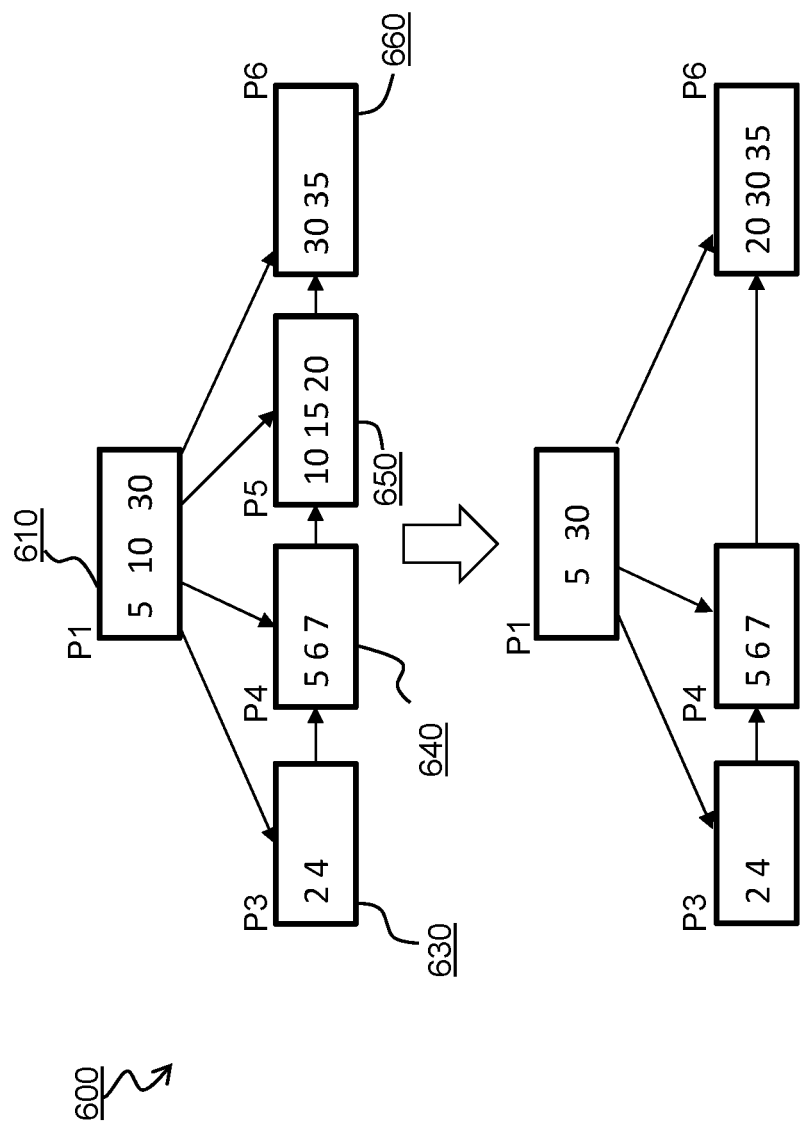
FIG. 6 illustrates another potential issue arising from the B+ tree modification.

FIG. 6 illustrates another potential issue arising from the B+ tree modification. Similar to the B+ tree 500 illustrated in FIG. 5, the B+ tree 600 in FIG. 6 includes an internal page P1 610 and its four child pages, P3 630, P4 640, P5 650 and P6 660. The child pages P3 630, P4 640, P5 650 and P6 660 may be leaf pages.

In FIG. 6, it is assumed that a NDP request on page P4 640 is completed and a query is processing the rows in page P4 640. It is further assumed that, while the query is being processed, another transaction, which results in the deletion of page P5 650, has occurred.

As part of the deletion of page P5 650, the "next-page" identifier (ID) of page P4 640 should be changed to the page ID of page P6 660, as illustrated at the bottom of FIG. 6. However, as page P4 640 is customized for the aforementioned query (i.e. query processing the rows in page P4 640), page P4 640 has page P5 650 as the next page while the query is being processed. This will render an incorrect query result when the NDP query proceeds to read page P5 650, because page P5 650, for example, has been re-allocated to another part of the B+ tree 600 or even re-allocated to different B+ tree.

Amazon Aurora™ provides 'parallel query' whose features are similar to those of near-data-processing. Amazon Aurora™ does not use the buffer pool while processing the parallel query. For example, Amazon Aurora™ bypasses the buffer pool when reading B+ tree pages for parallel query. Put another way, even if the pages already exist in the buffer pool, the query results in the access of the storage nodes to read the pages.

It is realized that there are some issues with a parallel query provided by Amazon Aurora™. One issue is the potential overhead that is added to the SQL nodes upon tracking the number of pages of table data in the buffer pool. Another issue is that the information used by Aurora is not accurate enough to determine whether it is more beneficial to perform the parallel query. For example, when pages containing "key1<50" are in the buffer pool but the query asks for "key1>100", it may be still more beneficial to perform the parallel query despite a large portion of the table data is present in the buffer pool.

Embodiments of the present disclosure provide a method of reading data maintained in a tree data structure, such as B+ tree, using near data processing (NDP) in a cloud native database. According to embodiments, NDP scan (for example, data read/search in NDP) does not block concurrent modifications of the the B+ tree, and retrieves consistent B+ tree pages even when the B+ tree is under concurrent modification. NDP scan also share the same memory pool (for example, the same buffer pool) with the regular data scan. Further, NDP can utilize one or more pages that already exist in the buffer pool (e.g. memory pool shared with the regular data scan) and can avoid input/output (IO) of these one or more pages.

According to embodiments, the memory in the buffer pool is used to store NDP pages received from the storage nodes. The buffer pool pages used by NDP that is associated with a particular query are not maintained in the buffer pool's data management structures in the computing node (e.g. SQL node), such as hash map, least recently used (LRU) list, and flush list. As such, the buffer pool pages for NDP associated with a particular query can be effectively hidden or separated from other database transactions, and therefore are not affected by buffer pool flushing and eviction processes in the computing node (e.g. SQL node). The allocation and release of the NDP pages are solely under the control of the query that requests the NDP. This has an advantage of sharing a memory pool between regular scans and NDP scans, while keeping NDP pages and regular pages separated from each other.

According to embodiments, a desired log sequence number (LSN) is included in the NDP request to the storage node. As the desired LSN is indicative of the page version, the storage nodes can provide the particular version of the requested pages using the desired LSN. Any concurrent modifications to these pages will not be seen by the NDP associated with that query as the particular version of pages will only be read (e.g. versioned page reads). For the sake of illustration, reading pages based on a desired LSN can be considered as taking a snapshot of the B+ tree at a certain point of time. The use of a desired LSN has an advantage in that page consistency can be maintained for the NDP B+ tree read, even if the B+ tree data structure is concurrently modified (i.e. concurrent modification to the B+ tree) while the storage nodes and the computing nodes (e.g. SQL nodes) are processing the NDP page.

According to embodiments, before a NDP request is sent to the storage nodes, the buffer pool is searched in order to determine if the (requested) page already exists in the buffer pool. If such a page exists, the page is copied into the pre-allocated NDP page memory (also part of the buffer pool), thereby avoiding extra IO transaction(s) associated with the storage nodes regarding that page.

Figure 7:
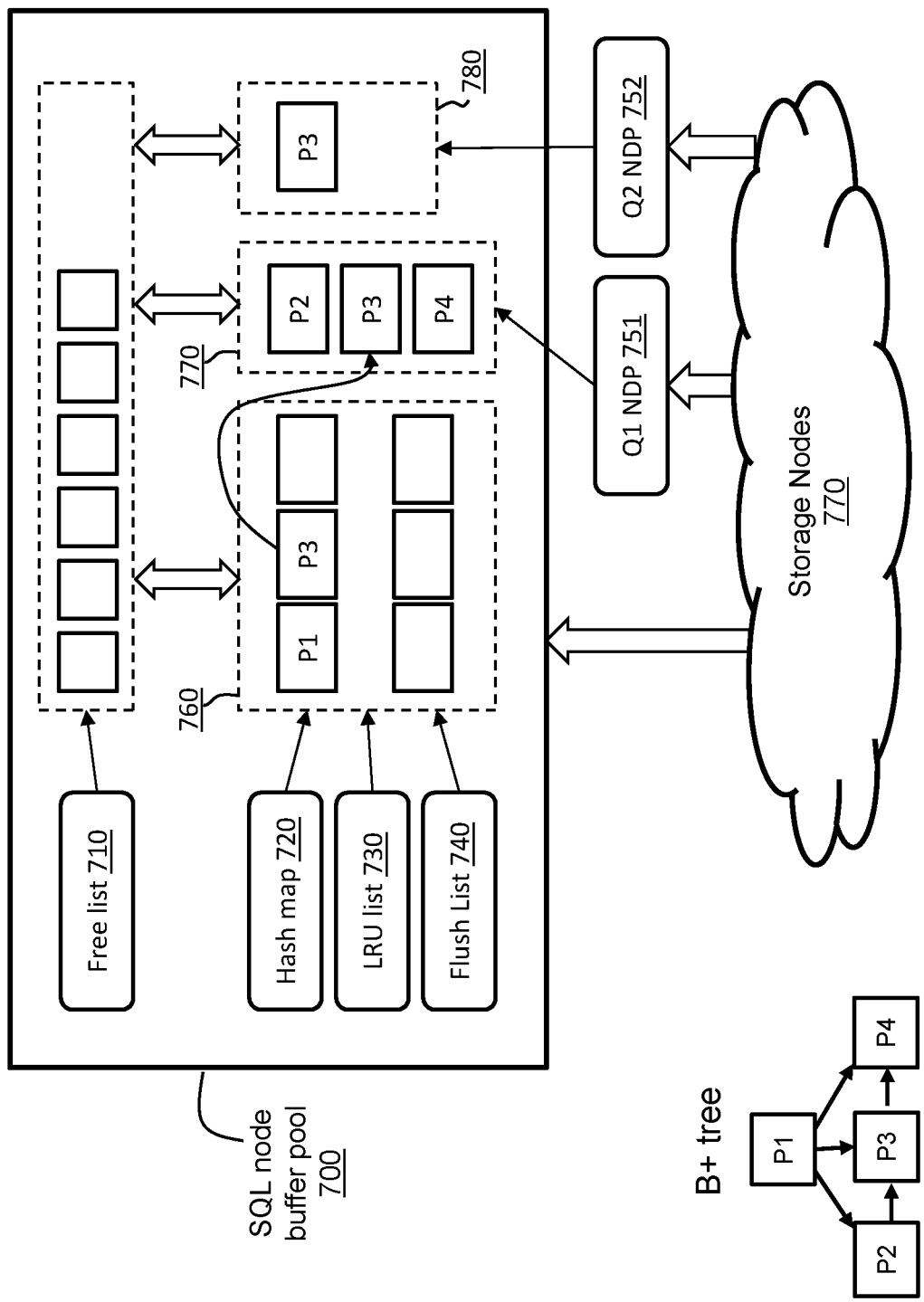
FIG. 7 illustrates a SQL node buffer pool containing both regular pages and NDP pages, in accordance with embodiments.

FIG. 7 illustrates a SQL node buffer pool containing both regular pages and NDP pages, in accordance with embodiments of the present disclosure. Referring to FIG. 7, the SQL node buffer pool 700 includes the free list 710, hash map 720, LRU list 730, and flush list 740. In another aspect, the SQL node buffer pool 700 is logically divided into the public regular page area 760 or general buffer pool and the private NDP cache areas 770 and 780, each of which is a private buffer pool associated with a particular query. Regular pages are contained in the public regular page area 760 and NDP pages are contained in the private NDP cache areas 770 and 780. Regular pages are managed by buffer pool structures such as the hash map 720, LRU list 730, and flush list 740. NDP pages are managed by the (NDP) queries Q1 751 and Q2 752 that request the NDP pages. Both regular pages and NDP pages are acquired from the free list 710 and can be returned to the free list 710 when evicted or freed. Regular pages and NDP pages share the SQL node buffer pool 700.

According to embodiments, desired LSN will be used in NDP page reads. When the master computing node (e.g. master SQL node) reads the regular page, the maximum desired LSN (e.g. the latest page version number) for that regular page will be used. In the case of FIG. 7, the NDP query Q2 752 reads page P3 from its private NDP cache area 780. The NDP page read carries a desired LSN, for example LSN=5000. Another transaction in this master SQL node is to read page P3 from the regular page area 760. Provided that the SQL node buffer pool 700 is in the master SQL node, the regular page read (e.g. reading page P3 from the regular page area 760) always carries the maximum desired LSN. This means the latest version of the requested regular page is needed.

According to embodiments, if pages already exist in the public regular page area, the existing regular page will be copied to the NDP query's private cache area, upon request for those pages by the NDP query. Referring to FIG. 7, it is assumed that an NDP query Q1 751 needs to read pages P2, P3, and P4. In this example, since page P3 already exists in the public regular page area 760, page P3 will be copied into the private NDP cache area 770 of the NDP query Q1 751.

The NDP query Q1 751 reads pages P2 and P4 using the desired LSN, for example LSN=6000.

Figure 8:
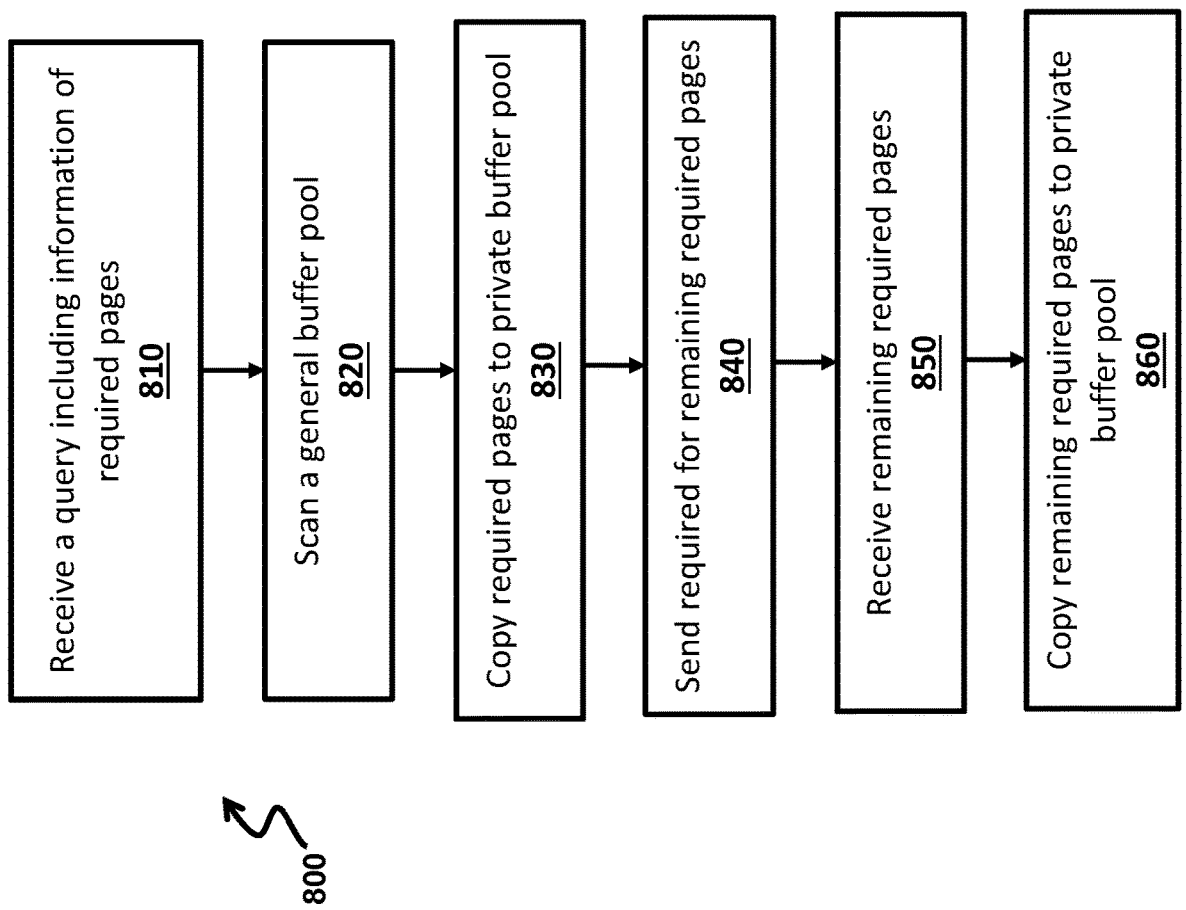
FIG. 8 illustrates a method for performing a query using near data processing (NDP) in a cloud native database, in accordance with embodiments.

FIG. 8 illustrates a method for obtaining pages for a query using near data processing (NDP) in a cloud native database, in accordance with embodiments. It will be understood that using NDP can define a manner in which the processing is being performed, for example NDP refers to a database processing paradigm which places processing power near data, for example bringing some of the SQL operators into the storage nodes.

The method includes receiving 810 a query, the query including information indicative of one or more required pages, the information further indicative of a version of each of the one or more required pages. It is understood that a query can define a question or set of actions to be taken or performed on the one or more required pages, which are stored within the database. The method further includes scanning 820 a general buffer pool to identify one or more of the required pages. For example, scanning can refer to one or more actions that can be performed in order to determine, find or identify that a required page is present within the general buffer pool. For example, scanning can entail searching for a marker, hash, log sequence number, other identifier which may be associated with a required page. Scanning may also be interpreted to be a full or partial comparison of the pages present in the general buffer pool with a required page. It is understood that the type of scanning can be dependent on the information that is included in the query.

Upon identification of one or more of the required pages in the general buffer pool, the method further includes copying 830 the identified one or more required pages into a private buffer pool associated with the query. According to embodiments, the private buffer pool is a portion of the buffer associated with the node, which is specifically assigned to the query. By being assigned to the query, the private buffer pool is separated from and non-accessible by for example another query.

Upon identification of no further required pages in the general buffer pool, the method further includes sending 840 a request to one or more storage nodes for one or more of the required pages remaining to be identified. The method further includes receiving 850 the one or more remaining required pages and copying 860 the received one or more remaining required pages into the private buffer pool. According to embodiments, the one or more remaining required pages can be used to define the one or more required pages that were not present within the general buffer pool. As the query requires these one or more required pages, the node still has to obtain these unfound required pages (remaining required pages) in order to perform one or more actions associated with the query. For example, if a query included information indicating that pages 1 and 2 are required pages, and during the scanning of the general buffer pool, only page 1 was identified as being present in the general buffer pool, it is realized that page 2 is a remaining required page.

According to embodiments, once the required pages are present within the private buffer pool, further actions can be taken in order to satisfy or respond to the query. For example, the query can define a question relating to some of the data stored within the database and the further actions can define one or more steps that are performed in association with the required pages, in order to determine, evaluate or calculate an answer or outcome to the query.

In some embodiments, the method further includes applying a shared lock to the identified one or more required pages prior to copying the identified one or more required pages. For example, a shared lock can define a feature wherein the page is locked to modification, however the page remains open for access to other searches. In some embodiments, the method further includes releasing the shared lock once the identified one or more required pages are copied.

In some embodiments, the method further includes applying a shared lock on a root of a B+ tree associated with the one or more required pages. In some embodiments, the method further includes comprising releasing the shared lock on the root of the B+ tree.

In some embodiments, the version of the one or more required pages is defined by a log sequence number (LSN). In some embodiments, the method further includes copying the received one or more remaining required pages into the general buffer pool.

Figure 9:
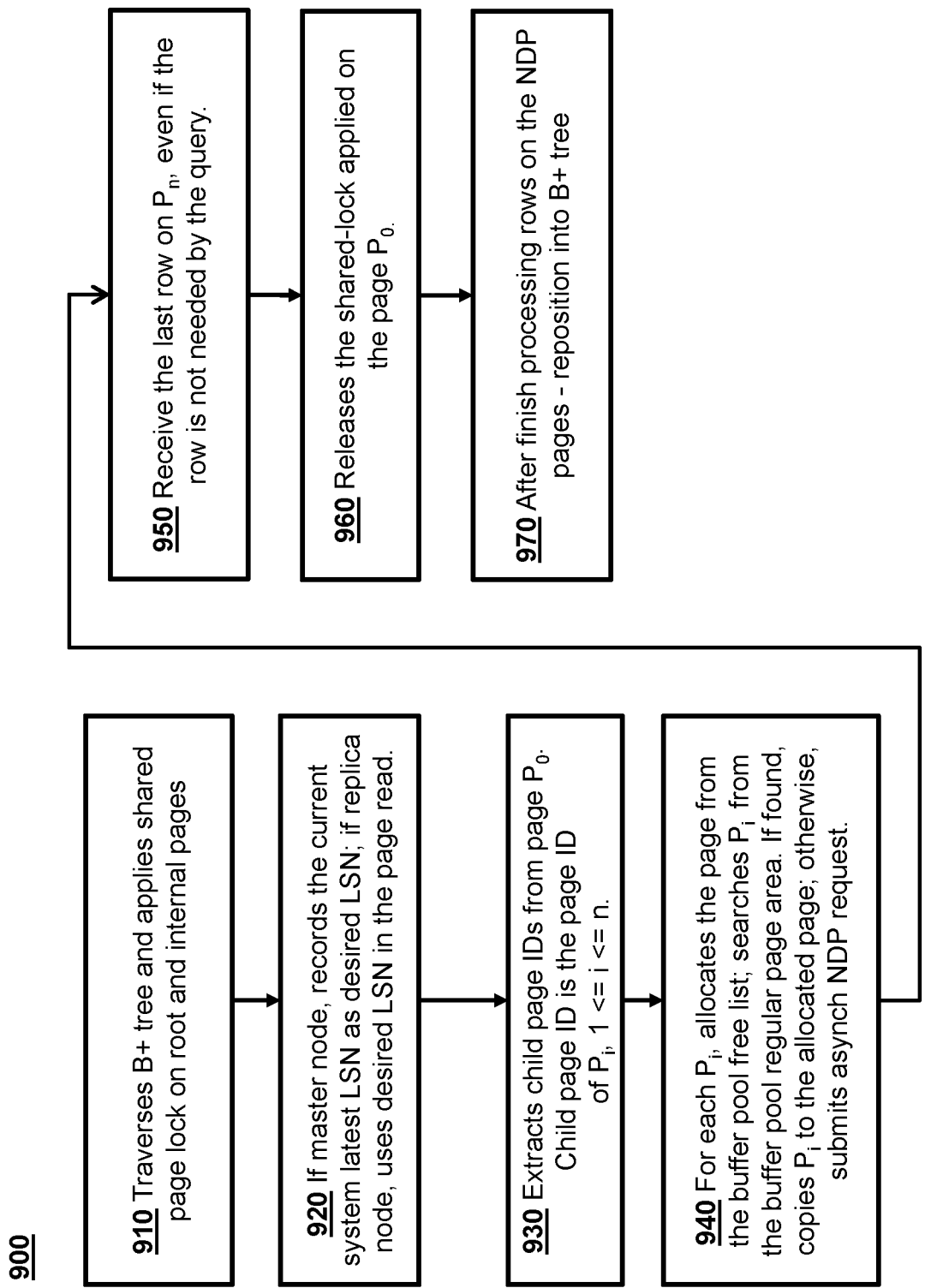
FIG. 9 illustrates a method of reading data maintained in a B+ tree data structure using NDP in accordance with embodiments.

FIG. 9 illustrates a method 900 of reading data maintained in a B+ tree data structure using near data processing (NDP) in accordance with embodiments of the present disclosure. It will be appreciated that steps illustrated below may be performed by components of the cloud-native database system 300 illustrated in FIG. 3. For example, steps involving communication to or from the database master node may be performed by the master SAL module 331 (i.e. SAL module associated with database master node 311) and that the steps involving communication to or from a database replica node may be performed by the replica SAL module 332 (i.e. SAL module associated with the database replica node 312).

At step 910, a computing node (e.g. SQL node) of the database system, from the top level downward, traverses the B+ tree structure and applies a shared page lock on the root and each internal page until the level-1 page is reached. The term 'level-1' refers to the level immediately above the leaf level (i.e. level-0) in the B+ tree data structure. The level-1 page is hereinafter referred to as page P0. According to embodiments, all the pages that a query caches into its NDP cache area (for example, the private buffer pool associated with the query) are leaf pages (i.e. level-0 pages).

On the page P0, the computing node searches the record that points to the level-0 page (leaf-level page or leaf page) to be visited next. This level-0 page to be visited next is hereinafter referred to as page Ps. In various embodiments, the B+ tree search can either be initiated with a goal of locating either the smallest value or a particular value in the tree.

At step 920, if the computing node is a master SQL node, while holding the shared-lock on the page P0, the computing node records the latest LSN of the page as the desired LSN for the NDP requests to be submitted at step 940. If the computing node is a replica SQL node, the desired LSN in the page read that will be used as a page read carries a desired LSN.

According to embodiments, the computing node records the latest LSN while holding shared-lock on page P0. The shared-lock prevents modification to page P0 by another query, so that the LSN can represent a consistent sub-tree rooted at page P0 (e.g. ensuring consistency of the tree structure). Put another way, the shared-lock ensures that no other transactions (e.g. actions from other queries) can change the tree structure on the sub-tree rooted on page P0, as for any such changes to be performed would require an exclusive-lock on page P0. For example, no other transactions can delete a child leaf page of the page P0 or shift rows from a child leaf to its sibling or the like. As such, the LSN represents a consistent sub-tree structure rooted at page P0.

According to embodiments, the value of a specific desired LSN is valid only for the period of reading the leaf pages of a particular level-1 page. That is, a specific desired LSN value has short life time, and therefore the storage nodes do not need to keep all old versions of pages. If the desired LSN has long life time, this can put heavy burden on the storage nodes (e.g. increase required overhead), for example when there is large update on the database, as the storage nodes have to keep numerous old versions of pages in order to serve the desired LSN with long life time.

Steps 910 and 920 are iterated for the remaining records on page P0, starting from the record following page Ps. Each record on page P0 is indicative of the page ID of each child page Pi of page P0, where 1≤i≤n and where n is the number of child pages of page P0. It is noted that for a particular P0, steps 910 and 920 are only performed once. Once P0 is shared-locked, iteration of the records on P0 will proceed. It is noted that P0 remains shared locked during these iterations. As such, there is no release and relock (of the shared-lock) of P0 during the iteration of the records on P0.

At step 930, the computing node extracts the page ID from each record on page P0. The extracted page ID is recorded or denoted as the page ID of page Pi. In other words, the computing node extracts the child page IDs from page P0.

For each page Pi, the following tasks illustrated for steps 940 to 950 are repeated until all records in page P0 are processed, or until a pre-defined condition is satisfied. At step 940, the computing node allocates a page from the buffer pool free list (e.g. free list 710 in FIG. 7) to store the page. The computing node allocates the page from the buffer pool free list into the query's NDP cache area (for example the private buffer pool associated with the particular query). The computing node does not allocate the page from the buffer pool into the memory area designated for hash map (e.g. hash map 720 in FIG. 7), LRU list (e.g. LRU list 730 in FIG. 7) or flush list (e.g. flush list 740 in FIG. 7).

Once the page from the buffer pool free list is allocated, the computing node searches for the page ID of page Pi from the regular page area of the buffer pool. If page Pi is found in the regular page area of the buffer pool, the computing node applies the shared lock to page Pi, copies page Pi to the allocated page (for example, thereby securing page Pi in the allocated page), and then releases the shared lock on the page Pi. For example, a shared lock can define a feature wherein the page is locked to modification, however the page remains open for access to other searches. However, if there is an exclusive lock on page Pi, which indicates that there is another transaction modifying the page Pi, the computing node will not apply the shared lock to page Pi until the exclusive lock is released. For example, an exclusive lock can define a feature wherein the page is locked to all modification and access until the exclusive lock is released, however the page remains open for access to other searches. In this instance, the page Pi copied into the NDP cache area can be considered to be a newer version than the desired LSN. However it is realised that the delay on applying the shared lock to page Pi is acceptable as the modification of page Pi during the exclusive lock, does not change the sub-tree structure.

On the other hand, if the page Pi is not found in the regular page area of the buffer pool, the computing node submits, to the storage nodes, an NDP request for the page Pi using the desired LSN. This request can be an asynchronous NDP request. The computing node will subsequently acquire the page Pi from the storage nodes and the acquired page will be allocated to the buffer pool free list, in addition to being saved in the query's NDP cache area, namely the private buffer pool associated with the query.

According to embodiments, the page ID of page P, is searched from the regular page area of the buffer pool (for example, the search performed at step 940) in order to reduced input and output (IO). Moreover, in the case of the computing node being a master SQL node, the search is performed in order to ensure that the storage nodes can serve the desired LSN requested on the page. In some embodiments, if the page is not present in the master SQL node buffer pool, the storage nodes can provide the latest page version. If the page is present in the master SQL node buffer pool, then the buffer pool contains the latest version of the page. Therefore, it is necessary that the desired LSN value is identified before searching page Pi in the regular page area in order to mitigate the race condition. For example, this can mitigate the situation wherein as soon as step 940 concludes that the page Pi is not present in the regular page area, another transaction or query brings page Pi into the regular page area.

According to embodiments, the last page that is sent to the storage nodes at steps 930 and 940 is tagged as "last page". When the storage nodes process this "last page", the storage node, at step 950, can send the last row of the last page (Pn) back to the computing node (SQL node), even if the row is not needed by the query. This value (e.g. the value of the last record on the page) will be used in step 970. According to embodiments, the action of the storage node sending the last row of the last page (Pn) back to the computing node does not have to be provided as a separate IO request and this action can be included in the request for the last page.

According to embodiments, the pages produced at steps 930 and 940 are chained or ordered in a list by their logical order (e.g. the sibling order of the leaf pages). The computing node loads page Ps into the regular page area, if this page is not already present in the regular page area. The shared page locks will be released with the exception of the shared-lock on page Ps. It should be noted that page Ps (i.e. the first page visited during the next NDP B+ tree traversal) is read as a regular page.

According to embodiments, if there are multiple pages to be submitted to the storage nodes in step 930 to 950, these pages can be put into one IO request. This optimization of the page submission to the storage nodes can reduce the IOPS (input/output per second) between the computing nodes (SQL nodes) and the storage nodes.

At step 960, the computing node releases the shared-lock applied to page P0, thereby allowing concurrent modification on the sub-tree. According to embodiments, if an asynchronous IO is used during step 940, the shared-lock on P0 can be released as soon as the IO request on Pn (e.g. the last page) is submitted. As such, in this situation there is no requirement that the computing node waits for completion of the IO request prior to releasing the shared-lock on P0. As such, being able to release the shared-lock before the IO completion can be beneficial in the NDP context because NDP-IO usually takes longer to complete than regular-IO, for example since the storage nodes must perform SQL-related-computing for NDP-IO.

After the processing of the rows on page Ps is finished, the computing node processes, at step 970, the first cached page (the NDP pages produced at steps 930 and 940, for example the pages that have been copied into the private buffer pool associated with the query). The cached pages (NDP pages) are processed in logical order (for example based on the fact that they are chained in the list). When processing a particular cached page is completed, the computing node releases that particular page back to the buffer pool free list. Step 970 is repeated until all cached pages are processed.

When there is no more cached pages to be processed (i.e. after finishing processing rows on the NDP pages P1 to Pn), the computing node determines the next page ID (e.g. repositioning into the B+ tree) based on whether the current page is in the NDP cached area or in the regular page area. If the current page is in the NDP cache area, the value of the last record on the page is used to initiate a B+ tree search (i.e. return to step 910) because the next page ID recorded in page Pn is not trustable. The next page ID of page Pn (e.g. the page ID of page Pn+1 located in the next sibling leaf) is not trustable and therefore cannot be used because page Pn+1 may have been deleted from the B+ tree. As such, another B+ tree search is needed in order to locate the next sibling leaf page.

On the other hand, if the current page is a regular page, the next page ID is trustable as the shared-lock was applied on the regular page. Therefore, the next page ID is the next page ID of the page Pn. If the computing node is a master SQL node, while holding the shared-lock on the page P0, the computing node records or denotes the latest LSN of the desired page as the desired LSN. If the computing node is a replica SQL node, the desired LSN in the page read will be used as a page read and carries the desired LSN. The computing node releases the shared lock on the current page and performs step 940 as illustrated above. The page ID of page Pn can be tagged as the "last page". The computing node subsequently performs step 970.

Figure 10:
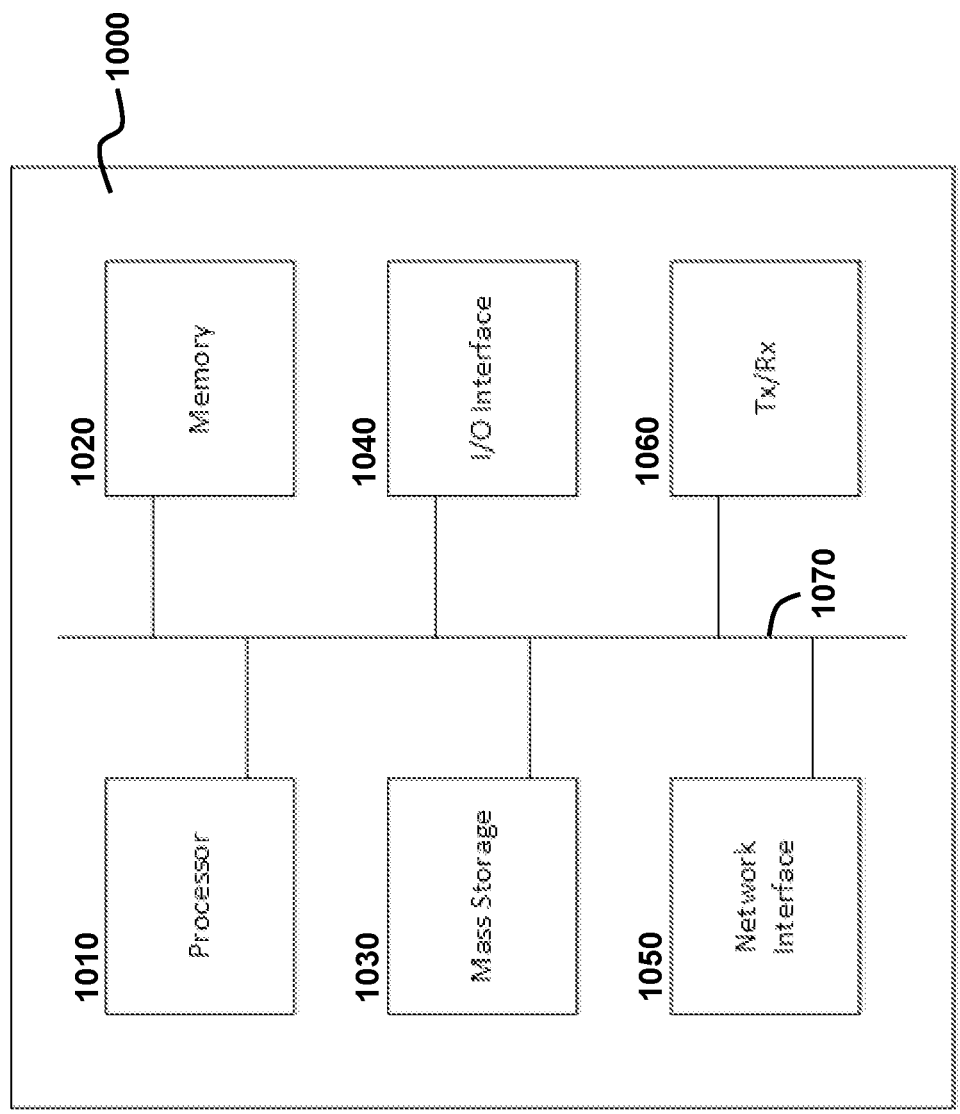
FIG. 10 illustrates, in a schematic diagram, an electronic device in accordance with embodiments.

FIG. 10 is a schematic diagram of an electronic device 1000 that may perform any or all of operations of the above methods and features explicitly or implicitly described herein, according to different embodiments of the present disclosure. For example, a dedicated hardware capable of executing instructions for operation of the above methods and features may be configured as electronic device 1000. The electronic device 1000 may be a device forming part of a coordinator, a platform controller, a physical machine or server, a physical storage server or data storage devices.

As shown, the device includes a processor 1010, such as a Central Processing Unit (CPU) or specialized processors such as a Graphics Processing Unit (GPU) or other such processor unit, memory 1020, non-transitory mass storage 1030, I/O interface 1040, network interface 1050, and a transceiver 1060, all of which are communicatively coupled via bi-directional bus 1070. According to certain embodiments, any or all of the depicted elements may be utilized, or only a subset of the elements. Further, the device 1000 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for obtaining one or more pages in response to a query using near data processing (NDP) in a cloud native database, the method comprising:
   receiving the query, the query including information indicative of one or more required pages, the information further indicative of a version of each of the one or more required pages;
   scanning a general buffer pool to identify one or more of the required pages;
   upon identification of one or more of the required pages in the general buffer pool, copying the identified one or more required pages into a private buffer pool portion of the general buffer pool assigned to the query;
   upon identification of no further required pages in the general buffer pool, sending a request to one or more storage nodes for one or more of the required pages remaining to be identified;
   receiving the one or more remaining required pages; and
   copying the received one or more remaining required pages into the private buffer pool.

2. The method of claim 1, further comprising applying a shared lock to the identified one or more required pages prior to copying the identified one or more required pages.

3. The method of claim 2, further comprising releasing the shared lock once the identified one or more required pages are copied.

4. The method of claim 1, wherein the version of the one or more required pages is defined by a log sequence number (LSN).

5. The method of claim 4, wherein LSN maximum defines a latest version.

6. The method of claim 1, further comprising applying a shared lock on a root of a B+ tree associated with the one or more required pages.

7. The method of claim 6, further comprising releasing the shared lock on the root of the B+ tree.

8. The method of claim 1, further comprising copying the received one or more remaining required pages into the general buffer pool.

9. A device supporting near data processing (NDP) in a cloud native database, the device comprising:
- a network interface for receiving data from and transmitting data to devices connected to a network;
- a processor; and
- machine readable memory storing machine executable instructions which when executed by the processor configure the device to:
  - receive a query, the query including information indicative of one or more required pages, the information further indicative of a version of each of the one or more required pages;
  - scan a general buffer pool to identify one or more of the required pages;
  - upon identification of one or more of the required pages in the general buffer pool, copy the identified one or more required pages into a private buffer pool portion of the buffer pool assigned to the query;
  - upon identification of no further required pages in the general buffer pool, send a request to one or more storage nodes for one or more of the required pages remaining to be identified;
  - receive the one or more remaining required pages; and
  - copy the received one or more remaining required pages into the private buffer pool.

10. A method of reading data in a data tree using near data processing (NDP) in a cloud native database, the method comprising:
- applying a shared page lock on a root and internal pages across the data tree, in a top-down manner, until reaching P0, the P0 referring to a page at a level immediately above the leaf level of the data tree;
- acquiring a desired log sequence number (LSN) while holding the shared page lock on the P0;
- after acquiring the desired LSN, for each extracted child page:
  - allocating a page from a free list of a buffer pool to a NDP cache area of the buffer pool, the NDP cache area designated for a specific query,
  - upon allocating the page to the NDP cache area, determining whether the child page is found at a regular page area of the buffer pool, and
  - securing the child page to the page allocated in the NDP cache area based on the determination;
- releasing the shared page lock applied on the P0;
- processing the pages allocated to the NDP cache area; and
- upon completion of processing, releasing each of the pages allocated to the NDP cache area back to the free list of the buffer pool.

11. The method of claim 10, further comprising:
upon completion of processing the pages allocated to the NDP cache area, determining a next-to-visit page based on whether the last child page is in the NDP cache area or in the regular page area.

12. The method of claim 11, wherein the last child page is in the NDP cache area, and the next-to-visit page is determined based upon another search on the data tree initiated using the last record on the last child page.

13. The method of claim 11, wherein the last child page is in the regular page area, the next-to-visit page is determined based on a next page identifier (ID) of the last child page.

14. The method of claim 10, wherein the child page is found at a regular page area of the buffer pool, the securing the child page includes:
- for each child page:
  - applying shared page lock on the child page;
  - copying the child page found at the regular page area to the page allocated in the NDP cache area; and
  - releasing the shared page lock on the child page.

15. The method of claim 10, wherein the child page is unfound at a regular page area of the buffer pool, the securing the child page includes:
- submitting, to a storage node, an asynchronous NDP request on the child page using the desired LSN.

16. The method of claim 15, wherein multiple child pages are submitted to a storage node via one input/output (IO) request.

17. The method of claim 10, wherein the desired LSN is valid only for a period of reading the child pages of the P0.

18. The method of claim 10, wherein allocating and releasing of the pages allocated to the NDP cache area are solely under control of the query that requests the NDP.

19. The method of claim 10, wherein the data tree is a B+ tree.

20. A device supporting near data processing (NDP) in a cloud native database, comprising:
- a network interface for receiving data from and transmitting data to devices connected to a network;
- a processor; and
- machine readable memory storing machine executable instructions which when executed by the processor configure the device to:
  - apply shared page lock on root and internal pages across the data tree, in a top-down manner, until reaching P0, the P0 referring to a page at a level immediately above the leaf level of the data tree;
  - acquire a desired log sequence number (LSN) while holding the shared page lock on the P0;
  - after acquiring the desired LSN, for each extracted child page:
    - allocate a page from a free list of a buffer pool to a NDP cache area of the buffer pool, the NDP cache area designated for a specific query,
    - upon allocating the page to the NDP cache area, determine whether the child page is found at a regular page area of the buffer pool, and
    - secure the child page to the page allocated in the NDP cache area based on the determination;
  - release the shared page lock applied on the P0;
  - process the pages allocated to the NDP cache area; and
  - upon completion of processing, release each of the pages allocated to the NDP cache area back to the free list of the buffer pool.

* * * * *